(12) United States Patent
Hinojosa

(10) Patent No.: US 11,279,505 B1
(45) Date of Patent: Mar. 22, 2022

(54) SYSTEM FOR RE-SECURING BALES WITH BROKEN OR DEFECTIVE WRAPPING

(71) Applicant: Jesse Hinojosa, San Marcos, TX (US)

(72) Inventor: Jesse Hinojosa, San Marcos, TX (US)

( * ) Notice: Subject to any disclaimer, the term of this patent is extended or adjusted under 35 U.S.C. 154(b) by 84 days.

(21) Appl. No.: 16/375,642

(22) Filed: Apr. 4, 2019

Related U.S. Application Data

(60) Provisional application No. 62/652,773, filed on Apr. 4, 2018.

(51) Int. Cl.
*A01F 25/14* (2006.01)
*B65B 11/00* (2006.01)

(52) U.S. Cl.
CPC ............ *B65B 11/004* (2013.01); *A01F 25/14* (2013.01)

(58) Field of Classification Search
None
See application file for complete search history.

(56) References Cited

U.S. PATENT DOCUMENTS

| | | | | |
|---|---|---|---|---|
| 443,620 A | * | 12/1890 | Orr | |
| 1,647,169 A | * | 11/1927 | Anton | A45C 11/20 150/154 |
| 2,705,557 A | * | 4/1955 | Hartman | B65D 85/07 206/83.5 |
| 4,483,127 A | * | 11/1984 | Forkner | A01F 25/13 100/100 |
| 4,852,330 A | * | 8/1989 | Carangelo | B60P 7/0876 53/399 |
| 4,869,363 A | * | 9/1989 | Goldberg | A01F 25/13 206/83.5 |
| 5,197,236 A | * | 3/1993 | Calhoun | A01F 25/13 52/3 |
| 5,388,702 A | * | 2/1995 | Jones | B65D 19/44 150/154 |
| 5,400,549 A | * | 3/1995 | Morgan | B09B 1/004 52/23 |
| 5,720,382 A | * | 2/1998 | Porter | A01F 25/13 150/154 |
| 8,777,516 B2 | * | 7/2014 | Slutz | B09B 1/004 405/129.9 |
| 2005/0042415 A1 | * | 2/2005 | Baecker | E04H 12/2292 428/99 |
| 2007/0261771 A1 | * | 11/2007 | Fitzgerald | B65D 65/08 150/154 |
| 2009/0283045 A1 | * | 11/2009 | Rutkowski | A01F 25/13 119/51.01 |
| 2011/0123759 A1 | * | 5/2011 | Rodrigues | H02G 3/0481 428/100 |
| 2011/0139323 A1 | * | 6/2011 | Yamada | B65D 65/08 150/154 |

(Continued)

*Primary Examiner* — Hemant Desai
*Assistant Examiner* — Tanzim Imam
(74) *Attorney, Agent, or Firm* — Plager Schack LLP; Mark H. Plager; Naomi Mann

(57) ABSTRACT

A system for re-securing a bale with defective or broken wrapping. The system has a waterproof material; at least one rope loop wherein the at least one rope loop is hermetically attached to the waterproof material and maintains waterproofing of the waterproof material; at least one rope wherein the at least one rope passes through an aperture defined by the at least one rope loop; and at least one O-ring wherein the at least one of O-ring is attached to a first end of rope of the at least one rope.

6 Claims, 3 Drawing Sheets

(56) References Cited

U.S. PATENT DOCUMENTS

| | | | |
|---|---|---|---|
| 2013/0032260 A1* | 2/2013 | Davies | B65B 11/02 |
| | | | 150/154 |
| 2013/0264375 A1* | 10/2013 | Knight | B65D 65/22 |
| | | | 229/87.01 |
| 2015/0246763 A1* | 9/2015 | Nowak | B65D 65/38 |
| | | | 229/87.01 |
| 2016/0029566 A1* | 2/2016 | Gaudet | E02D 3/00 |
| | | | 34/233 |
| 2018/0222671 A1* | 8/2018 | Outhavong | B32B 5/26 |
| 2019/0002187 A1* | 1/2019 | Kahawaiolaa | B65B 7/26 |

* cited by examiner

SYSTEM FOR RE-SECURING BALES WITH BROKEN OR DEFECTIVE WRAPPING

RELATED APPLICATION

This application claims priority to provisional patent application U.S. Ser. No. 62/652,773 filed on Apr. 4, 2018, the entire contents of which is herein incorporated by reference.

BACKGROUND

The embodiments herein relate generally to agricultural product transportation, and more particularly, to a system for re-securing of bales of previously wrapped plant material designated for transport or storage. This plant-based material comprising the bales may consist of hay or a mixture of grasses such as ryegrass, timothy, brome, fescue, Bermuda grass, orchard grass or cotton.

The transportation of bales is a common practice in the agricultural community. The plant-based materials that make up these bales are used by multiple industries, including, but not limited to animal feed and textiles. These bales are typically formed into geometric shapes to make transport easier, square bales or round bales. Bale sizes may vary but industry standard for hay and cotton bales are typically 8 feet wide by 8 feet in diameter. The bales may then be wrapped in a protective material to make shipping easier and reducing waste in the transportation process. This protective material is usually a plastic film that can be tightly wrapped around the bale to help it retain its shape. This film is placed around the bale at the time that the plant-based material is formed into the bale by sophisticated machinery.

The inherent problem with the plastic wrap is that it can be defective having the potential of tearing or dry rotting. This causes the structural integrity of the bale to become compromised resulting in a loss of shape and a waste of bale material either during storage or transport. It is a difficult process to reseal the plastic film wrapping without the proper and expensive baling equipment. Many bale users purchase the bales already covered and do not have the appropriate bailing equipment.

Therefore, what is needed is a system that can be rapidly deployed to re-secure the bale with defective or broken wrapping for transportation or storage.

SUMMARY

A system for re-securing a bale with defective or broken wrapping, the system comprising: a waterproof material; at least one rope loop wherein the at least one rope loop is hermetically attached to the waterproof material and maintains waterproofing of the waterproof material; at least one rope wherein the at least one rope passes through an aperture defined by the at least one rope loop; and at least one O-ring wherein the at least one of O-ring is attached to a first end of rope of the at least one rope.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a system for re-securing a bale with defective or broken wrapping and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. a water proof material
b. rope
c. rope loops
d. O-rings

The various elements of the device of the present disclosure may be related in the following exemplary fashion. It is not intended to limit the scope or nature of the relationships between the various elements and the following examples are presented as illustrative examples only.

Figure 1:
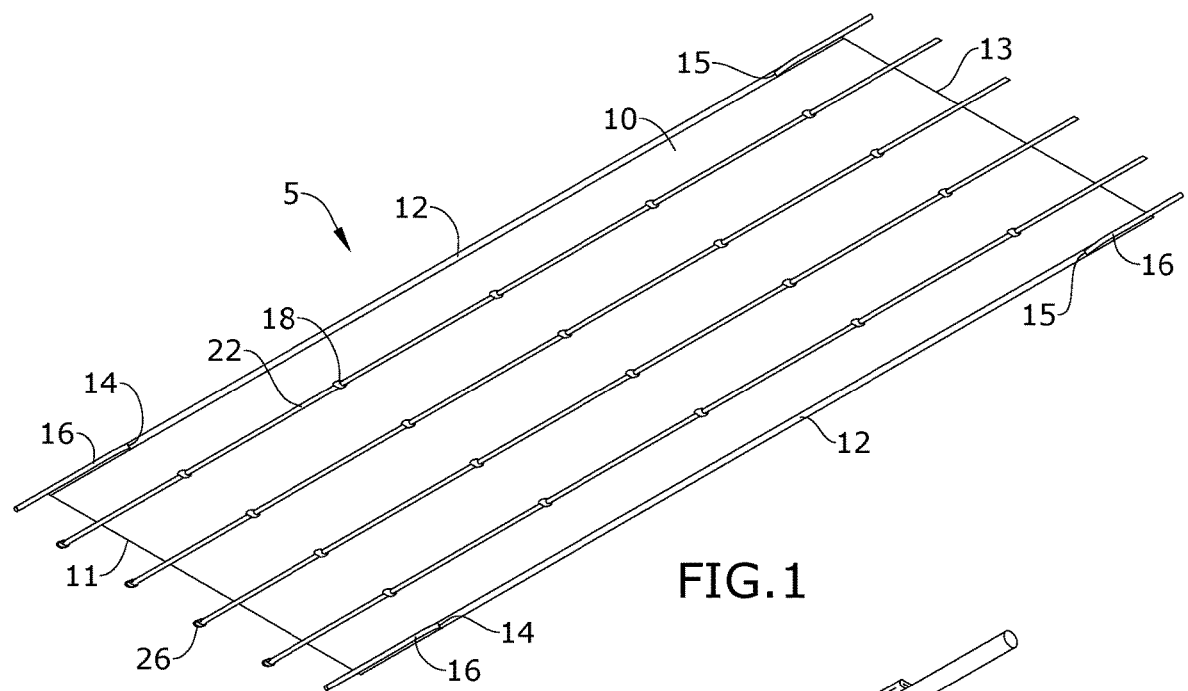
FIG. 1 is a perspective view of one embodiment of the present disclosure.
Figure 2:
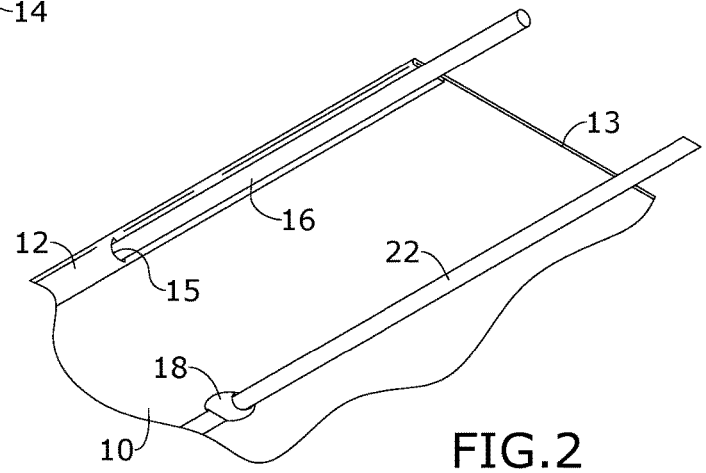
FIG. 2 is a detail exploded perspective view of one embodiment of the present disclosure.
Figure 3:
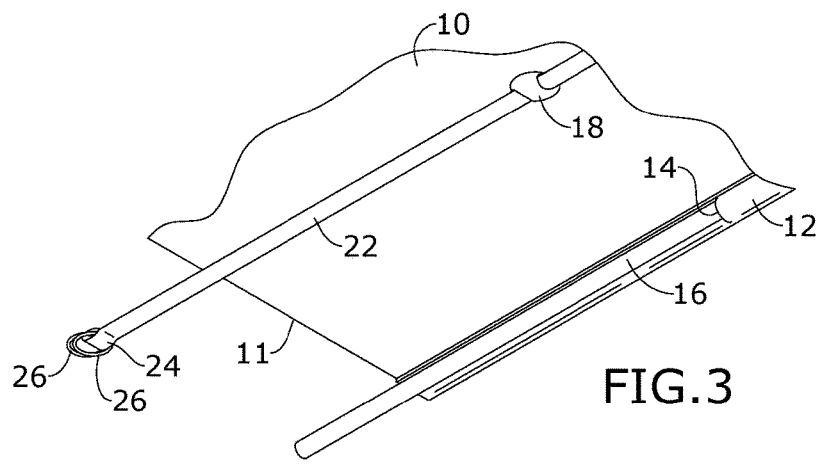
FIG. 3 is a detail exploded perspective view of one embodiment of the present disclosure.
Figure 4:
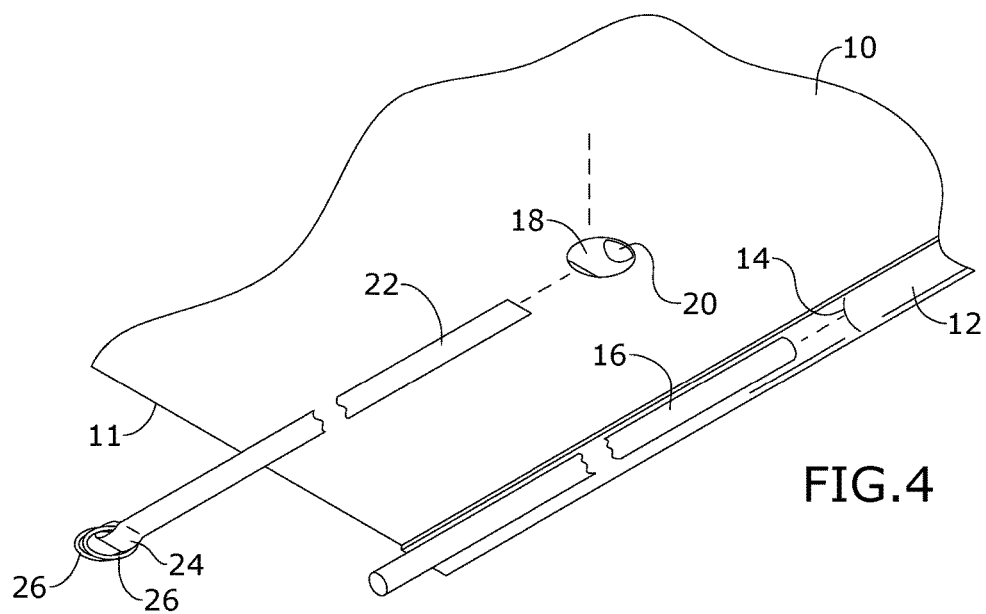
FIG. 4 is a detail exploded perspective view of one embodiment of the present disclosure.

By way of example, and referring to FIGS. 1-7, some embodiments of the present disclosure include a system for re-securing a bale with defective or broken wrapping 5, comprising a waterproof material 10, at least one rope loop 18, at least one rope 22 that may pass through an aperture 20, FIG. 4, defined by the at least one rope loop 18, a looped rope end 24 attached to the at least one rope and at least one O-ring 26 attached to the at least one rope 22. Referencing FIG. 2, the at least one O-ring 26 may be attached to the at least one rope 22 by the looped rope end 24 by way of the looped rope end 24. In alternative embodiments, the at least one rope 18 may be a webbing strip. The at least one rope 18 may be a belt. In some embodiments, the waterproof material 10 may be any non-permeable material. The waterproof material 10 may be a non-permeable tri-laminate material. In alternative embodiments, the waterproof material 10 may be a plastic. In some embodiments, the waterproof material 10 may be a waterproof tarp. In alternative embodiments, the waterproof material 10 may be in the shape of a sheet.

In alternative embodiments and referencing FIGS. 2-3, the waterproof material 10, may have a side rope channel 12 and in some embodiments have a first side rope channel and a second side rope channel. A side rope 16 may pass through the side rope channel 12, by way of the side rope 16 entering a side rope channel entrance slot 14 and the side rope 16 exiting a side rope channel 12 through a side rope channel exit 15.

Figure 5:
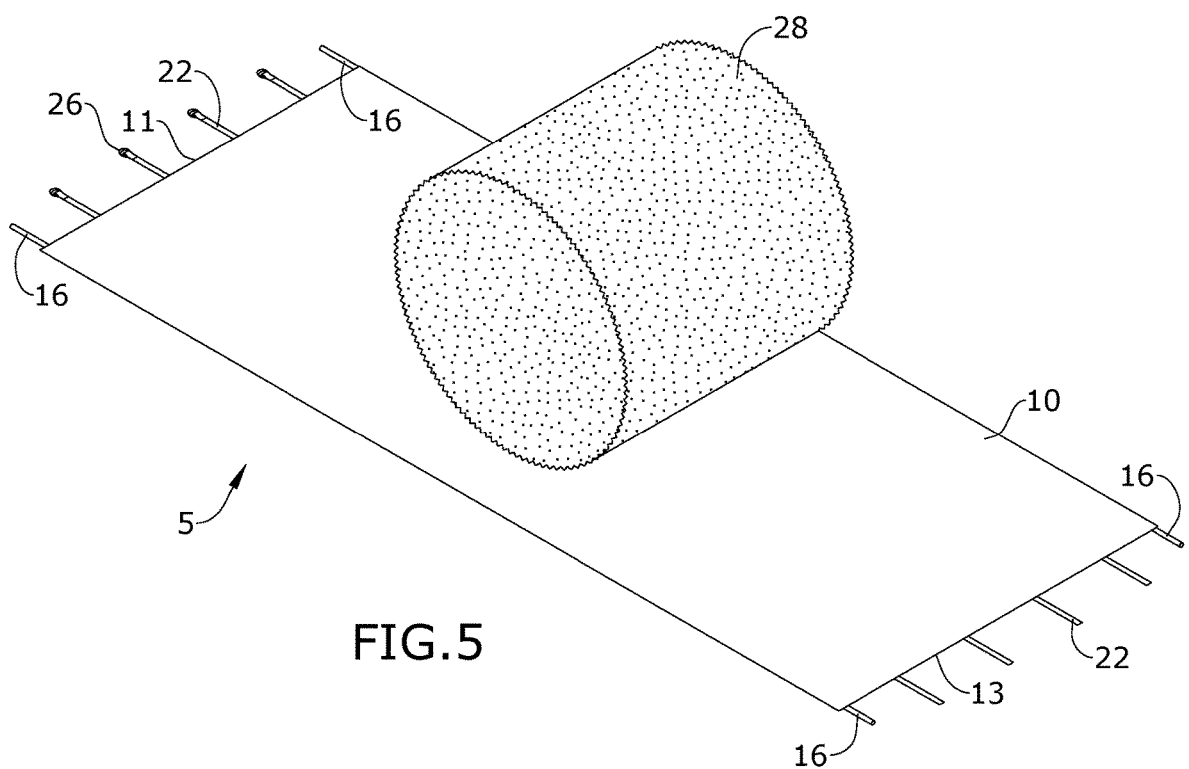
FIG. 5 is a perspective view of one embodiment of the present disclosure in use.
Figure 6:
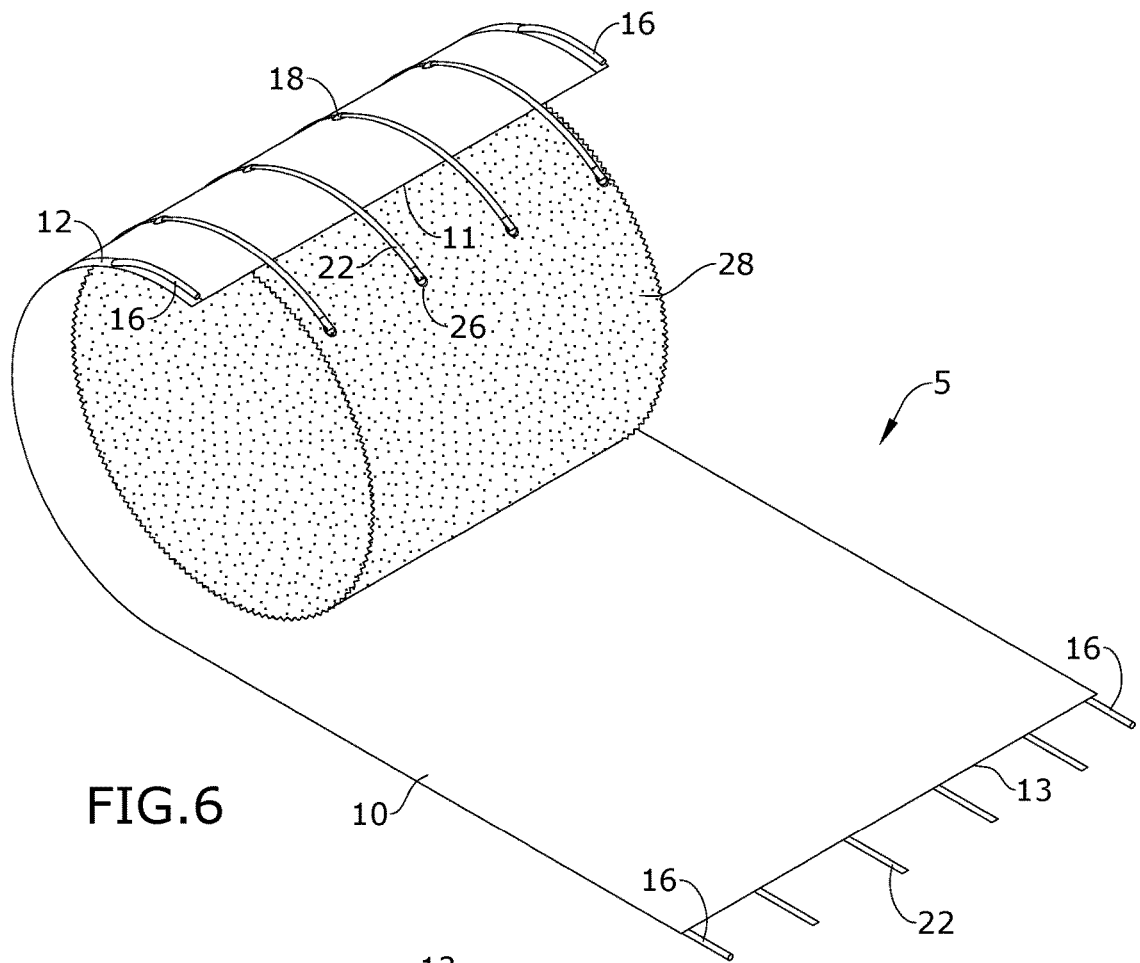
FIG. 6 is a perspective view of one embodiment of the present disclosure in use.
Figure 7:
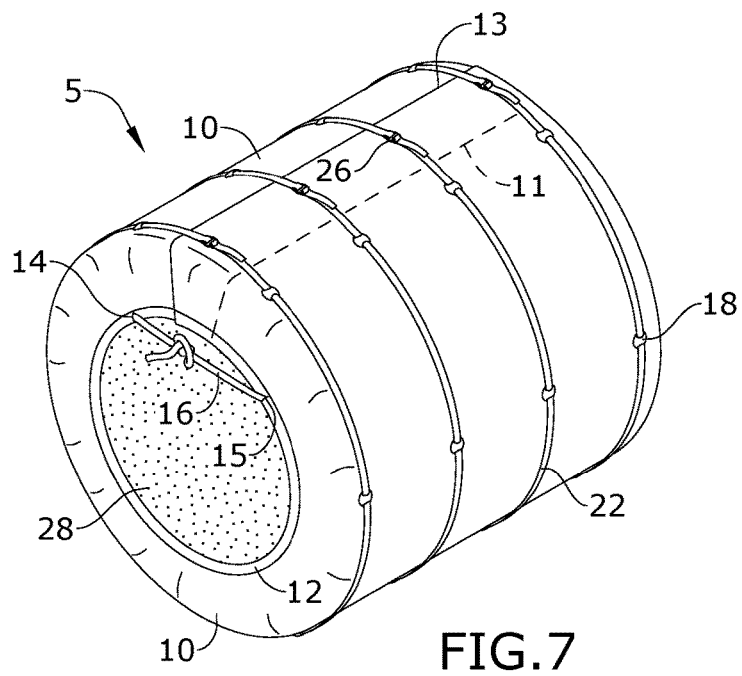
FIG. 7 is a perspective view of one embodiment of the present disclosure in use.

Some embodiments and referencing FIGS. 5-7 may show the system in use. Referencing FIG. 5, a bale 28 may be placed on an underside of the system 5. Referring to FIG. 6, a first short end 11 of the system 5 may be rolled over the bale. Referring to FIG. 6-7, a second short end 13 of system 5 may be rolled over the bale to meet the first short end of the system 5, showing one potential configuration of the system in use. In alternative embodiments, bale 28 may be round. In some embodiments, bale 28 may be square.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for resecuring a bale with defective or broken wrapping, the system comprising:
    a waterproof material;
    at least one rope loop, wherein the at least one rope loop is hermetically attached to the waterproof material and maintains waterproofing of the waterproof material;
    at least one rope, wherein the at least one rope passes through an aperture defined by the at least one rope loop; and
    at least one O-ring,
    wherein the at least one O-ring is attached to a first end of the at least one rope,
    wherein the waterproof material is a single continuous monolithic sheet having an outer sheet surface, an inner sheet surface, and end sides including a first end side, a second end side opposite the first end side, a third end side between the first end side and the second end side, and a fourth end side opposite the third end side and between the first end side and the second end side,
    wherein the at least one rope extends across the outer sheet surface of the waterproof material between and parallel to the third end side and the fourth end side,
    wherein the at least one rope further extends over the first end side and the second end side of the waterproof material,
    wherein a second end section of the at least one rope is configured to secure to the first end of the at least one rope via the at least one O-ring,
    wherein the waterproof material is configured to wrap around the bale and to contain the bale on the inner sheet surface of the waterproof material in order to resecure the bale,
    wherein the waterproof material comprises a first side rope channel along the third end side and a second side rope channel along the fourth end side,
    wherein the first side rope channel and the second side rope channel each extend parallel to the at least one rope,
    wherein the first side rope channel comprises a first side rope channel entrance slot which is proximate to and offset from the first end side,
    wherein the first side rope channel further comprises a first side rope channel exit slot which is proximate to and offset from the second end side,
    wherein the second side rope channel comprises a second side rope channel entrance slot which is proximate to and offset from the first end side, and
    wherein the second side rope channel further comprises a second side rope channel exit slot which is proximate to and offset from the second end side.

2. The system of claim 1, further comprising a first side rope and a second side rope, wherein the first side rope passes through the first side rope channel by passing into the first side rope channel entrance slot and out of the first side rope channel exit slot, and wherein the second side rope passes through the second side rope channel by passing into the second side rope channel entrance slot and out of the second side rope channel exit slot.

3. The system of claim 1, wherein the at least one rope is a webbing strip.

4. A system for resecuring a bale with defective or broken wrapping, the system comprising:
    a waterproof material;
    at least one rope loop, wherein the at least one rope loop is hermetically attached to the waterproof material and maintains waterproofing of the waterproof material; and
    at least one rope, wherein the at least one rope passes through an aperture defined by the at least one rope loop,
    wherein the waterproof material is a single continuous monolithic sheet having an outer sheet surface, an inner sheet surface, and end sides including a first end side, a second end side opposite the first end side, a third end side between the first end side and the second end side, and a fourth end side opposite the third end side and between the first end side and the second end side,
    wherein the at least one rope extends across the outer sheet surface of the waterproof material,
    wherein the at least one rope further extends over the first end side and the second end side of the waterproof material between and parallel to the third end side and the fourth end side,
    wherein a first end section of the at least one rope and a second end section of the at least one rope are configured to secure to each other,
    wherein the waterproof material is configured to wrap around the bale and contain the bale within the waterproof material on the inner sheet surface of the waterproof material in order to resecure the bale,
    wherein the waterproof material comprises a first side rope channel along the third end side and a second side rope channel along the fourth end side,
    wherein the first side rope channel and the second side rope channel each extend parallel to the at least one rope,
    wherein the first side rope channel comprises a first side rope channel entrance slot which is proximate to and offset from the first end side,
    wherein the first side rope channel further comprises a first side rope channel exit slot which is proximate to and offset from the second end side,
    wherein the second side rope channel comprises a second side rope channel entrance slot which is proximate to and offset from the first end side, and
    wherein the second side rope channel further comprises a second side rope channel exit slot which is proximate to and offset from the second end side.

5. The system of claim 4, further comprising a first side rope and a second side rope, wherein the first side rope passes through the first side rope channel by passing into the first side rope channel entrance slot and out of the first side rope channel exit slot, and wherein the second side rope passes through the second side rope channel by passing into the second side rope channel entrance slot and out of the second side rope channel exit slot.

6. The system of claim 4, wherein the at least one rope is a webbing strip.

\* \* \* \* \*